United States Patent Office 3,130,063
Patented Apr. 21, 1964

3,130,063
STABILIZATION OF FLUID SUSPENSIONS OF FILLER GRADE CLAY
Nathan Millman and Mark E. Fretz, Macon, Ga., assignors to J. M. Huber Corporation, Locust, N.J., a corporation of New Jersey
No Drawing. Filed Mar. 23, 1961, Ser. No. 97,752
6 Claims. (Cl. 106—308)

The present invention relates to stabilized suspensions of filler grade clay and methods of stabilizing such suspensions.

In the manufacture of paper, clay in an aqueous suspension is normally used in coating colors and/or as a filler. Since clay is usually shipped in a dry form, each user is required to maintain equipment for transporting and handling the dry clay, as well as equipment for preparing an aqueous suspension of the clay before use.

Filler grade clay, as described herein, contains a very high percentage of coarse material with one example containing 64% coarser than 2 microns, 40% coarser than 5 microns with only 36% finer than 2 microns. Another example of filler clay contains 60% coarser than 5 microns and only 22% finer than 2 microns.

Particle sizes as used herein are expressed in microns measured in terms of equivalent spherical diameters by standard test procedures employing Stokes' Law of Sedimentation.

Stabilized suspensions of finer grades of coating clay have been produced as described in Patent No. 2,440,601, when over 65% of the clay is finer than 2 microns, by increasing the clay concentration to more than 68% in the presence of a deflocculant. This process and other known processes of producing stabilized suspensions of coating grade clays cannot be used with coarser filler grade clays since the coarser particles settle out rapidly.

The primary object of the present invention is to provide a stable aqueous suspension of filler grade clays and to provide a method of producing such suspensions.

A further object of the invention is to provide a stable fluid suspension of coarse filler grade clay which can be transported and handled in a fluid condition and which will remain in a stable suspension for a period of time sufficient to permit normal shipping and handling.

Another object of the invention is to provide a stable aqueous suspension of coarse filler grade clay which can be used in paper and other recipes in place of dry clay.

These and other objects of the invention will become apparent from the following specification and the claims appended thereto.

The present invention is practiced generally by dispersing a filler grade clay in water containing a deflocculant and a water thickening agent. The water thickening agent is present in a quantity sufficient to increase the viscosity of the deflocculated clay from about 25% to 800% but not in excess of about 4000 centipoises.

The filler grade clays used successfully in this process will pass when slurried substantially completely through a 325 mesh screen which will retain particles larger than 44 microns. The clay has from 20% to 60% of particles coarser than 5 microns and from 35% to 80% coarser than 2 microns. The presence of at least 20% of the clay as particles finer than 2 microns has been found to materially assist the increase in viscosity caused by the treatment with a thickening agent.

In preparing stable aqueous suspensions containing from 55% to 75% of clay, the clay must be in a highly dispersed condition. The deflocculated condition can be arrived at by following any of the known methods and by use of any of the known deflocculants, examples of which are caustic soda, soda ash, sodium silicate, ammonia, "Tamol deflocculants" (these are sodium salts of polymeric carboxylic acid and sodium salts of condensed naphthalene sulfonic acid and are deflocculants produced by Rohm & Haas Company, Philadelphia, Pa.), and particularly phosphates, some of which are trisodium phosphate, tetrasodium pyrophosphate, sodium hexametaphosphate, sodium acid pyrophosphate, tetrasodium phosphate and sodium tripolyphosphate. The dispersion is normally adjusted to have the pH above 5, preferably between about 6 and 7.

Thickening agents which have been found to be effective are usually high molecular weight organic carbohydrates which swell or dissolve in water, such as gums, resins, or soaps. Among agents of this type are swollen starches, soaps, cellulose derivatives, karaya gum, guar gum, distearyl dimethyl ammonium chloride, sodium polyacrylate, and sodium alginate.

Dispersions following the teachings of the invention are formed by adding the dry clay, while agitating, to water containing enough deflocculant to produce a complete dispersion of the solids in the water, forming a slurry. The thickening agent is then added to the slurry, while continuing the agitation, to produce an increase in the viscosity of the slurry in excess of 25%. If desired, the pH can be increased by the addition of dilute caustic in small quantities. The thickening agent may be in the water with the deflocculant prior to adding the clay or may even be placed in the water ahead of the deflocculant.

Dispersions may also be prepared from a clay filter cake by treating with a deflocculant and a thickening agent. Dispersions formed directly from clay filter cakes will usually contain about 70% solids.

Deflocculation of clays in water by chemical treatment reduces the viscosity of the system and separates particles into more or less discrete sizes. Assuming that adequate mechanical forces are applied to disintegrate clay aggregates, the efficiency of deflocculation depends largely on the type and amount of dispersing chemical. Once the clay system is deflocculated, the individual particles become susceptible to differential sedimentation. Such sediments can become thick and firm, thus sealing off container bottom outlets preventing the flow of liquid from the above suspension, even if the liquid is subjected to considerable force.

The degree of sedimentation depends largely on the particle size of the clay and its concentration in the suspension. For example, a coating clay, in which about 80% of particles by weight are finer than 2 microns, will deposit a considerable amount of sediment from a 30% suspension and little, if any, sediment from a 70% suspension. Clays containing less than 50% of particles finer than 2 microns will, if completely deflocculated, usually deposit substantial quantities of material even from a 70% suspension, making such slurries impractical for tank car shipments.

The viscosity of 70% suspensions depends on the chemical treatment involved and particularly on the particle composition of the clay. While a viscosity of several thousand centipoises may be pumpable, it is of course preferable that such viscosities do not exceed about 500 centipoises. Such suspensions permit, whenever convenient, the emptying of tank cars by gravity flow. Hence, the desired result in following the teachings of this invention is to provide a stable suspension containing 70% by weight of relatively coarse clays and having a viscosity which will permit free flow from tank cars after a transit period of about 14 days or more.

Clays mined and refined by J. M. Huber Corporation have been used in practicing the invention, and these clays have the following particle size distribution:

TABLE A

| Clays | Particle Size Distribution, percent by Weight | | | |
|---|---|---|---|---|
| | Residue on 325 Mesh Screen, 44 Microns | Coarser than 10 Microns | Coarser than 5 Microns | Finer than 2 Microns |
| Degritted crude from Huber #20 Mine | 0.24 | 9.0 | 20.0 | 62.4 |
| Clay #55 [1] (Exp.) | 0.17 | 11.6 | 25.1 | 55.4 |
| Huber SWW | 0.012 | 16.0 | 31.0 | 48.8 |
| Huber CWF | 0.32 | 19.5 | 39.9 | 35.9 |
| Huber Coarse Fraction | 0.8 | 36.8 | 59.7 | 22.6 |

[1] Clay #55 is an experimental clay produced by blending the degritted crude clay described above with Huber SWW.

In the following examples, a settling time of 14 days was used since this has been found to be sufficient to permit shipments to any point normally utilizing filler grade coarse clays.

*Example I*

1818 grams of water was placed in a container 14 inches deep and 7⅜ inches in diameter and 8.620 grams of sodium hexametaphosphate was dissolved therein. A 3-inch by 5/16-inch mixing blade positioned ½ inch from the bottom of the container was turned at 1305 r.p.m., and 4342 grams (4310 grams dry basis) of "Huber CWF" clay was added in 3 minutes time with the mixing continuing for an additional 20 minutes. A sample was then taken for viscosity test. The sample was cooled to 25° C. and mixed for 2 minutes on a mechanical mixer. The viscosity of the sample was determined on a Brookfield viscosity tester at 20 r.p.m. with a No. 2 spindle. The sample was then returned to the batch.

The batch then had 0.862 gram carboxymethyl-cellulose (CMC–HV–7HP, Hercules Powder Company) added thereto and mixed for an additional 40 minutes. A second sample was then tested for viscosity in the same manner as the first sample. The pH of the batch was determined at this time.

A settling test was then conducted by filling a graduated cylinder with approximately 1000 milliliters of slurry and then covering tightly. The weight of slurry was found by weighing the cylinder. The amount of dry clay was determined by multiplying the weight of slurry by the percent of clay solids.

The slurry in the cylinder was allowed to stand undisturbed for 14 days. The stability of the suspensions was determined by evaluating the amount and type of sediment remaining in the bottom of the cylinder after draining the effluent at the end of the prescribed settling (standing) time. The slurry was drained from the cylinder at an angle of 45° into a stainless steel cup. The cylinder was then set upright and the sediment in the bottom was probed with a rod to determine whether it was soft, hard, sticky, dilatant, etc. The sediment in the cylinder was then dried and the weight of dry sediment determined. The percent sediment was then determined by the following formula:

$$\frac{\text{Grams dry sediment}}{\text{Grams dry clay in original slurry}} \times 100 = \text{percent sediment}$$

The following results were noted:

Viscosity of first sample _____ 110
Viscosity of second sample _____ 431
pH of slurry _____ 5.29
Percent settled in 14 days _____ 6.0

Example I was repeated as a control with the same total mixing time without using the thickener, the results being as follows:

pH of slurry _____ 5.18
Percent settled in 14 days _____ 29.9

*Example II*

Example I was repeated using 28.73 grams of Tamol (8.62 dry basis) as the deflocculating agent with the following results:

Viscosity of first sample _____ 133
Viscosity of second sample _____ 762
pH of slurry _____ 5.70
Percent settled in 14 days _____ 3.9

Example II was repeated as a control without using a thickener with the results as follows:

pH of slurry _____ 5.80
Percent settled in 14 days _____ 39.8

*Example III*

Example I was repeated using 25.86 grams of water glass (12.93 grams dry basis) as the deflocculating agent and 0.431 gram CMC as the thickener with the following results:

Viscosity of first sample _____ 111
Viscosity of second sample _____ 846
pH of slurry _____ 5.8
Percent settled in 14 days _____ 5.4

Example III was repeated as a control without using a thickener with the results as follows:

pH of slurry _____ 5.70
Percent settled in 14 days _____ 62.6

All the slurries of Examples I, II, and III, when thickeners were used, were pumpable at the end of the 14-day test and were satisfactory for shipping.

Example I was repeated using various quantites of tetrasodium pyrophosphate as a deflocculating agent and various quantities of carboxymethylcellulose as a thickening agent with the results as shown in the table below:

TABLE B
HUBER CWF CLAY

| Grams of Chemical Added to Slurry | | Slurry pH | Slurry Viscosity, cps | Percent Settling on Dry Weight of Clay | |
|---|---|---|---|---|---|
| TSPP | CMC | | | 7 days | 14 days |
| 8.62 | 0 | 6.38 | 113 | 27.4 | 44.6 |
| 8.62 | 0.151 | 6.49 | 146 | 0 | 0 |
| 8.62 | 0.216 | 6.45 | 161 | 0 | .9 |
| 8.62 | 0.431 | 6.43 | 185 | .05 | .05 |
| 8.62 | 0.862 | 6.40 | 402 | .05 | .05 |

HUBER COARSE FILLER CLAY

| 12.93 | 0 | 6.40 | 120 | 48.9 | ---- |
| 12.93 | 0.431 | 6.45 | 162 | 2.9 | 4.8 |

The examples with no thickening agent serve as controls and illustrate the marked effect produced by using the thickening agent in various quantities.

In order to establish the importance of the deflocculating agent, Example I was repeated using various deflocculating agents and varying the quantity of the thickening agent with the results as illustrated in the following table:

TABLE C

HUBER CWF CLAY

| Grams of Chemical Added to Slurry (dry basis) | | Slurry pH | Slurry Viscosity, cps. | Percent Settling on Dry Weight of Clay | |
|---|---|---|---|---|---|
| | | | | 7 days | 14 days |
| Calgon | CMC | | | | |
| 8.62 | 0 | 5.18 | 110 | 17.7 | 29.9 |
| 8.62 | 0.151 | 5.21 | 136 | 5.4 | 8.7 |
| 8.62 | 0.862 | 5.29 | 431 | 2.4 | 6.0 |
| Tamol | CMC | | | | |
| 8.62 | 0 | 5.80 | 133 | 20.5 | 39.8 |
| 8.62 | 0.151 | 5.80 | 189 | 2.6 | 5.2 |
| 8.62 | 0.862 | 5.70 | 762 | 0.3 | 3.9 |

HUBER COARSRE FRACTION CLAY

| Trisodium Phosphate | CMC | | | | |
|---|---|---|---|---|---|
| 10.78 | 0 | 6.50 | 250 | 10.0 | 17.0 |
| 10.78 | 0.431 | 6.55 | 342 | 1.4 | 3.0 |

From Tables B and C, it can be clearly seen that TSP and TSPP give the best results when used with CMC, but satisfactory results are also obtained with numerous other materials.

Additional tests conducted clearly indicated that no appreciable change in settling percentages occurred when varying the percent clay solids in the slurry between 56% and 72%.

In order to determine the applicability of the process to clays of various particle size distribution, tests were run following the process as set forth in Example I on the Huber clays listed above. Acceptable results were obtained with each clay, with the settling percentage increasing with increases in the coarse particle percentage of the clay.

In order to demonstrate the effectiveness of various thickeners, Example I was repeated using, instead of carboxymethylcellulose, thickeners as listed in the table below in the quantities as shown. The settling of the clay is also illustrated in this table.

TABLE D

| Thickener | Percent Based on the Weight of Water | Viscosity of Slurry, cps. Brookfield, 20 r.p.m. | Percent Settling on Dry Weight of Clay | |
|---|---|---|---|---|
| | | | 7 days | 14 days |
| None | 0 | 113 | 27.4 | 44.6 |
| Jaguar MD-3 | .012 | 138 | 0.4 | 3.8 |
| Do | .024 | 199 | 0.34 | 0.4 |
| Arguad 2 HT.85 | .082 | 222 | 0.5 | 1.0 |
| Do | .120 | 1,022 | 0.33 | 0.31 |
| Cooked Starch [1] (converted) | 2.40 | 514 | 0.28 | 0.61 |
| Do | 1.40 | 280 | 0.27 | 2.56 |
| Cooked Starch [2] | .60 | 204 | 1.1 | 6.5 |
| Sodium Alginate | .094 | 240 | 1.05 | 0.49 |
| Kayara Gum | 1.88 | 264 | 3.02 | 9.25 |
| Sodium Polyacrylate | .12 | 177 | 2.34 | 3.62 |
| Do | .16 | 274 | 0.16 | 1.50 |
| Cellosize WP 4400 | 0.12 | 140 | 0.29 | 1.44 |
| Do | .024 | 271 | 0.35 | .69 |
| Do | .048 | 921 | 0.53 | .44 |
| Methocel 4000 | .012 | 150 | .4 | .82 |
| Do | .024 | 390 | .4 | 1.12 |
| Do | .048 | 1,281 | .25 | .30 |
| Sodium Stearate (.2% TSPP+ sufficient NaOH to raise pH to 8.5) | 1.20 | 150 | 4.82 | 16.9 |

Jaguar MD-3 is a guar gum, and arquad 2 HT.85 is a di-stearyl dimethyl ammonium chloride. Cellosize WP 4400 is hydroxyethyl cellulose (a nonionic synthetic colloid produced by Union Carbide Chemical Company) and Methocel 4000 is a methylcellulose (produced by Dow Chemical Company).
[1] This is a chlorinated starch, Stayco M, A. E. Staley Mfg. Co.
[2] This is a natural starch.

The percentage of clay solids in the slurry affect both the viscosity and the settling rate of the treated slurry. In the following table, Example I, using .2% TSPP and .01% CMC, was repeated using a clay containing 64% of material coarser than 2 microns and the percent solids were varied as indicated. The table also shows the percent settled in 14 days for each concentration.

TABLE E

| Percent Clay | Viscosity, cps. | Percent settled in 14 Days |
|---|---|---|
| 70 | 185 | .05 |
| 68 | 128 | .26 |
| 66 | 93 | .26 |
| 64 | 88 | .12 |
| 56 | 30 | .22 |

Having thus described the preferred embodiments of the invention, it should be understood that numerous modifications may be resorted to without departing from the teachings and scope of the invention.

We claim:
1. A method of producing a stable aqueous suspension of clays having a solids content of from about 55% to 75% with the clay having in excess of 35% in the form of particles larger than 2 microns with at least 20% in the form of particles larger than 5 microns which comprises dispersing the clay in water containing a deflocculating agent present in a quantity sufficient to completely disperse the solids in the water forming a slurry and adding thereto while under agitation a thickening agent for water in a quantity sufficient to increase the viscosity of the slurry in excess of 25%.

2. A stabilized aqueous suspension of clay having a solids content of from about 55% to 75% with the clay having in excess of 35% in the form of particles larger than 2 microns at least 20% in the form of particles larger than 5 microns in which a deflocculating agent maintains the clay in dispersed condition and a water thickening agent maintains the slurry in a condition of increased viscosity such that settling is minimal over prolonged periods.

3. The method as set forth in claim 1 wherein the deflocculating agent is trisodium phosphate.

4. The method as set forth in claim 1 wherein the deflocculating agent is tetrasodium pyrophosphate.

5. The method as set forth in claim 1 wherein the thickening agent is carboxymethylcellulose.

6. The method as set forth in claim 1 wherein the thickening agent is guar gum.

References Cited in the file of this patent

UNITED STATES PATENTS

| 2,772,981 | Smart | Dec. 4, 1956 |
| 2,987,473 | Millman et al. | June 6, 1961 |